(12) United States Patent
Orr (10) Patent No.: US 7,394,844 B1
(45) Date of Patent: Jul. 1, 2008

(54) CODE DIVISION MULTIPLE ACCESS EMPLOYING ORTHOGONAL FILTER BANKS

(75) Inventor: David E. Orr, Vancouver, WA (US)

(73) Assignee: XtendWave, Inc., Dallas, TX (US)

( * ) Notice: Subject to any disclaimer, the term of this patent is extended or adjusted under 35 U.S.C. 154(b) by 575 days.

(21) Appl. No.: 10/849,535

(22) Filed: May 19, 2004

(51) Int. Cl.
H04B 1/00 (2006.01)

(52) U.S. Cl. ............... 375/135; 375/229; 375/295; 708/300; 708/311

(58) Field of Classification Search ......... 375/130, 375/135, 229, 232, 236, 295, 316, 346, 350, 375/132, 230, 354, 362, 363; 708/100, 160, 708/300, 313, 314, 316, 322, 323; 370/464, 370/498, 505, 506
See application file for complete search history.

(56) References Cited

U.S. PATENT DOCUMENTS

| | | | | |
|---|---|---|---|---|
| 5,228,055 | A * | 7/1993 | Uchida et al. ............... | 375/142 |
| 5,926,791 | A | 7/1999 | Ogata et al. ................ | 704/500 |
| 5,995,539 | A * | 11/1999 | Miller ....................... | 375/222 |
| 6,332,043 | B1 | 12/2001 | Ogata ........................ | 382/240 |
| 6,581,081 | B1 * | 6/2003 | Messerly et al. ............ | 708/322 |
| 6,826,242 | B2 * | 11/2004 | Ojard et al. ................ | 375/350 |
| 6,909,808 | B2 | 6/2005 | Stanek ....................... | 382/232 |
| 7,058,004 | B2 * | 6/2006 | Jain et al. ................... | 370/204 |
| 2005/0249312 | A1 * | 11/2005 | Bode et al. .................. | 375/308 |
| 2006/0146913 | A1 * | 7/2006 | Feher ......................... | 375/130 |
| 2007/0140384 | A1 * | 6/2007 | Choi et al. .................. | 375/341 |

OTHER PUBLICATIONS

Do, Anh Hong, Office Action, Dec. 28, 2006, U.S. Appl. No. 10/876,269.
Fotakis, Aristocratis, Office Action, Mar. 7, 2007, U.S. Appl. No. 10/756,197.

* cited by examiner

Primary Examiner—Chieh M. Fan
Assistant Examiner—Naheed Ejaz
(74) Attorney, Agent, or Firm—Merchant & Gould PC; Stanley J. Gradisar

(57) ABSTRACT

Wavelet filters computed from a wavelet transform are used for encoding, transmitting, receiving, and decoding spread spectrum signals on multiple parallel frequency channels. The transmitter encodes the data stream via a mapping to a basis set of wavelets which are orthogonal across the time domain. The spread spectrum data is parsed from a serial bit stream to several parallel streams. The number of bits per symbol need not remain constant. Signals are created from each symbol by first up sampling by inserting zeros between successive symbols. These signals are passed through a bank of low-pass and high-pass filters derived from a wavelet packet transform. The resulting signal is transmitted in the base band of the transmission system, or transmitted by modulating the carrier of the transmission system. At the receiver, the steps are reversed to recover the symbols. Symbol decisions are made through any one of a number of methods.

19 Claims, 5 Drawing Sheets

CODE DIVISION MULTIPLE ACCESS EMPLOYING ORTHOGONAL FILTER BANKS

RELATED APPLICATIONS

This application is related to and derives priority from U.S. Provisional Application No. 60/471,961 entitled CODE DIVISION MULTIPLE ACCESS EMPLOYING ORTHOGONAL FILTER BANKS, filed May 19, 2003, which is incorporated herein by reference.

FIELD OF THE INVENTION

This disclosure relates to the art of telecommunications systems; more specifically it relates to the use of modulation of orthogonal waveforms generated by filter banks wherein the data is encoded according to various CDMA techniques.

BACKGROUND

Modulating a signal for radio transmission involves the manipulation and allocation of two resources among a plurality of communicators; these resources are frequency and time. Division of a frequency spectrum, so that each pair of communicators is allocated part of the spectrum for all of time, is called "Frequency Division Multiple Access" (FDMA). Division of time, so that each of the communicators is allocated a large part, or all, of the spectrum for units of the divided time is called "Time Division Multiple Access" (TDMA). In Code Division Multiple Access (CDMA), every communicator will be allocated the entire spectrum all of the time, and each communicator is assigned a unique code.

CDMA employs unique spreading codes to spread base band data before transmission. The CDMA signal is transmitted in a channel, the transmission signal sent below noise level. The CDMA receiver then uses a correlator to de-spread the wanted signal, which is passed through a narrow band pass filter. Unwanted signals will not be de-spread and will not pass through the filter. Codes take the form of a carefully designed one/zero sequence produced at a much higher rate than that of the base band data. The rate of a spreading code is referred to as chip rate rather than bit rate.

TDMA operates by chopping up the transmission channel into sequential time slices. Each user of the channel takes turns transmitting and receiving in a round-robin fashion. In reality, only one communicator is actually using the channel at any given moment, however the communicator only uses the channel for short bursts of time. The communicator is then preempted to allow other communicators to transmit. The TDMA method is very similar to time slicing in a computer processor to run multiple applications simultaneously.

In contrast CDMA permits every communicator to transmit at the same time. Conventional wisdom teaches that this is simply not possible. Using conventional modulation techniques, it most certainly is impossible. What makes CDMA work is a special type of digital modulation called "spread spectrum". This form of modulation takes the user's stream of bits and splatters them across a very wide channel in a pseudo-random fashion. The "pseudo" part is very important, since the receiver must be able to undo the randomization in order to collect the bits together in a coherent order.

As an analogy, consider a room full of people, all trying to carry on one-on-one conversations. In TDMA each pair of communicators takes turns talking. They keep their turns short by speaking only one sentence at a time. As there is never more than one person speaking in the room at any given moment, no one has to worry about being heard over the background noise. In CDMA, all pairs of communicators talk at the same time, but they all use a different language. Because none of the listeners understand any language other than that of the individual to whom they are listening, the background interference doesn't cause communications problems.

SUMMARY

The present invention comprises an apparatus and method of for using wavelet filters computed from a wavelet transform as a means of encoding, transmitting, receiving and decoding spread spectrum signals on multiple parallel frequency channels. The method of encoding and decoding has been found to achieve very high transmission rates for random data over great distances. First, the transmitter, using a spread spectrum technique spreads a data stream. At the transmitter, (1) the spread spectrum binary data is parsed from a serial bit stream to several parallel streams; the number of bits per symbol need not remain constant, there are many means of setting this level in the field of information theory (the most prevalent would be a "water filling" approach. (2) Within each of the parallel bit streams symbols are formed from the bits and consist of the set $\{0, 1, \ldots 2^k-1\}$ where k is the number of bits per symbol. The symbols are normally Gray coded to decrease the probability of a bit error, however other forms of pre-coding can be used. (3)[a] Signals are created from each symbols by first up-sampling—by inserting zeros between successive symbols (this defines a signal—no longer just an abstraction of the information, [b] These signals are passed through a bank of low-pass and high-pass filters that are derived from a wavelet packet transform (the wavelet and scaling functions, or, equivalently the low-pass and high-pass reconstruction filters). [c] The filters are paired: one high-pass with a low-pass. The ordering is alternated to preserve "natural" frequency ordering. (4) The steps 3[a], 3[b] and 3[c] are recursively repeated $\log_2 N$ times for a signal of length N. The resulting signal is transmitted either in the base band or is transmitted by modulating the carrier of the transmission system. At the receiver (1) steps 1 through 3 are reversed to recover symbols, with the up-sampled signal down-sampled to remove inserted zeroes. Symbol decisions are made through any one of a number of methods, which increase the probability of a correct decision.

DETAILED DESCRIPTION

A spread spectrum signal is used having the following characteristics:

1. The signal occupies a bandwidth much greater than necessary to send the information.

2. The bandwidth is spread by means of a code that is independent of the data. The independence of the code distinguishes this from standard modulation schemes in which the data modulation will always spread the spectrum somewhat.

3. The receiver synchronizes to the code to recover the data. The use of an independent code and synchronous reception allows multiple users to access the same frequency band at the same time.

In order to protect the signal, the code used is pseudo-random. The code, called "direct sequence spread spectrum" appears to be random, but is actually deterministic, so the receiver can reconstruct the code for synchronous detection. The receiver knows how to generate the same code, and correlates the received signal with that code to extract the data.

Figure 1:
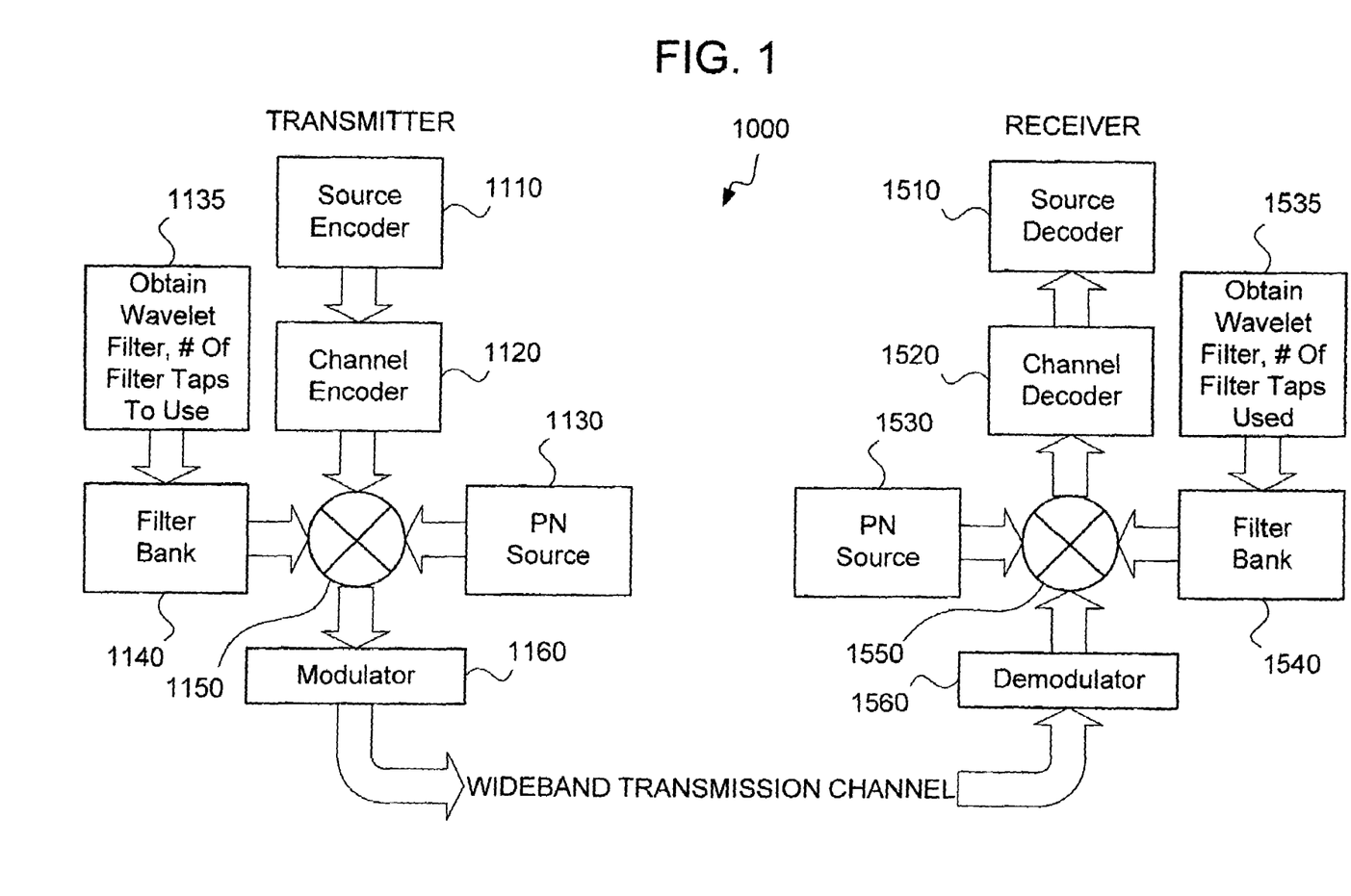
FIG. 1 is a diagram of an exemplary embodiment of the invention.

FIG. 1 shows a simplified direct sequence spread spectrum system 1000 employing an orthogonal filter bank to generate pulse-shaping codes; for clarity, the figure shows one channel operating in one direction only. Signal transmission consists of the following steps:

1. Data are source-encoded 1110 (if compression is required).

2. Channel encoding 1120 is performed.

3. A pseudo-random code is generated 1130; the code different for each channel and each successive connection over a given channel.

4. Obtain the name of the wavelet filter bank and the number of filter taps 1135.

5. The filter-bank generates a set of orthogonal filters 1140.

6. The channel and source encoded data modulates the pseudo-random code 1150 (the data are "spread"). And the spread signal is used to modulate the filter generated by the filter-bank (using pulse-amplitude modulation, for example).

7. The data-modulated filter, in turn, 1160 modulates a carrier.

8. The modulated carrier is amplified and broadcast over a wideband transmission channel.

Signal reception consists of the following steps:

1. The carrier is received and amplified 1560.

2. Obtain the type of wavelet filter and the number of filter taps used 1535.

3. The filter bank in the receiver generates matching filters, which are applied to carrier 1540.

4. The receiver demodulator and matched filters recovers the spread digital signal 1550.

5. A pseudo-random code is generated 1530, matching the anticipated signal.

6. The receiver acquires the received code and phase locks its own code to it 1550.

7. The received signal is correlated with the generated code, extracting the channel-encoded data 1550.

8. Channel decoding is performed 1520.

9. Source decoding is performed if required 1510.

Generating Pseudo-Random Codes

The pseudo-random code must have the following properties:

1. It must be deterministic. The subscriber station must be able to independently generate the code that matches the base station code.

2. It must appear random to a listener without prior knowledge of the code (i.e. it has the statistical properties of sampled white noise).

3. The cross-correlation between any two codes must be small.

4. The code must have a long period (i.e. a long time before the code repeats itself).

Code Correlation

In general the correlation function has these properties:

1. It equals 1 if the two codes are identical

2. It equals 0 of the two codes have nothing in common

Intermediate values indicate how much the codes have in common. The more they have in common, the harder it is for the receiver to extract the appropriate signal. The receiver uses cross-correlation to separate the appropriate signal from signals meant for other receivers, and auto-correlation to reject multi-path interference.

Pseudo-Noise (PN) Spreading

The (forward error-corrected coded) FEC data modulates the pseudo-random code, as shown in FIG. 1. Some terminology related to the pseudo-random code:

1. Chipping Frequency ($f_c$): the bit rate of the PN code.

2. Information rate ($f_i$): the bit rate of the digital data.

3. Chip: One bit of the PN code.

4. Epoch: The length of time before the code starts repeating itself (the period of the code). The epoch must be longer than the round trip propagation delay (typically, the epoch is on the order of several seconds).

Figure 2:
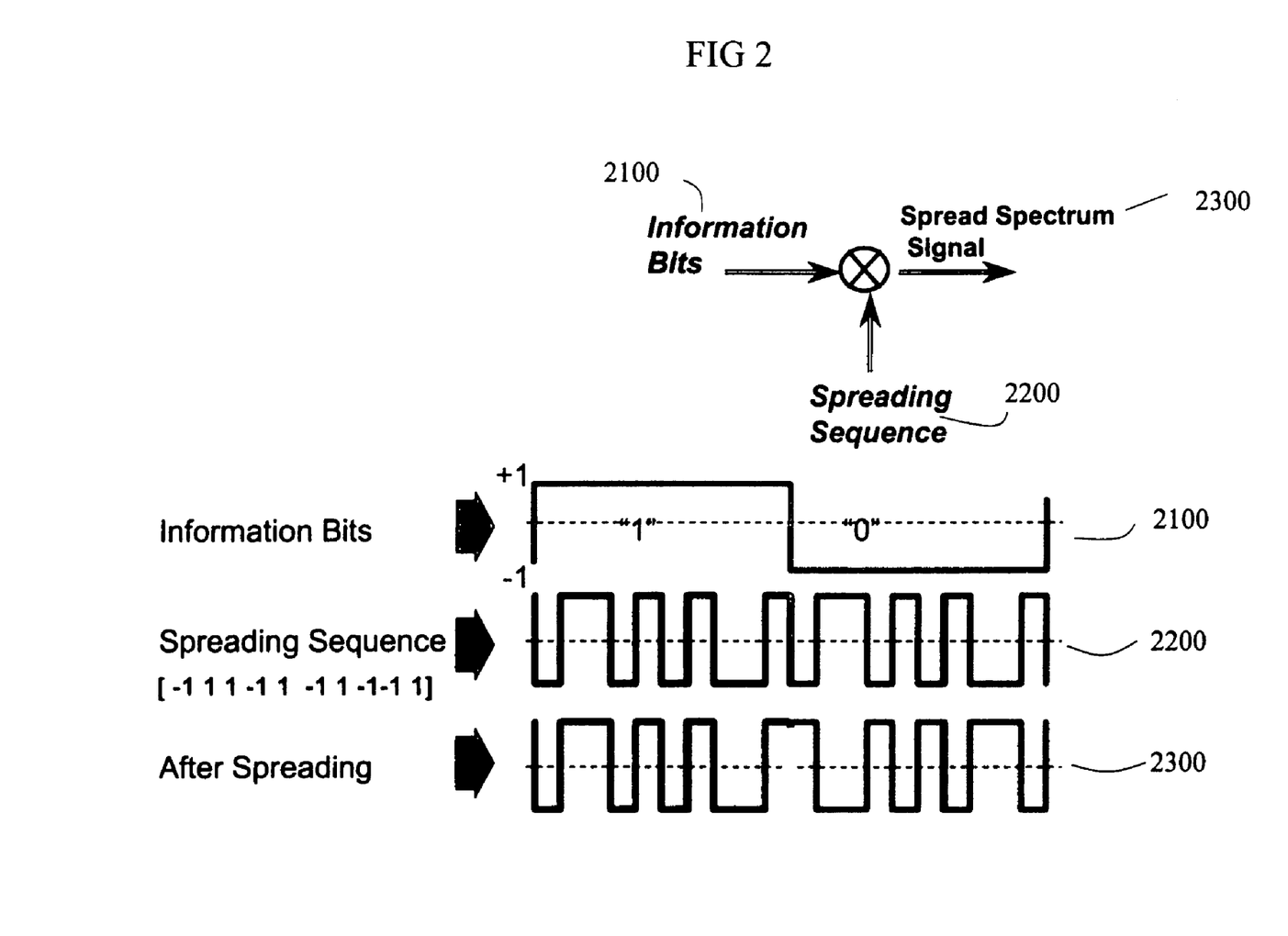
FIG. 2 shows the process of spreading a data signal by use of a pseudo-random sequence.

FIG. 2 shows the process of frequency spreading. In general, the bandwidth of a digital signal is twice its bit rate. The bandwidths of the information data ($f_i$) and the PN code are shown together. The bandwidth of the combination of the two, for $f_c > f_i$, can be approximated by the bandwidth of the PN code.

Processing Gain

An important concept relating to the bandwidth is the processing gain ($G_p$)—theoretical system gain that reflects the relative advantage that frequency spreading provides. The processing gain is equal to the ratio of the chipping frequency to the data frequency:

$$G_P = \frac{f_c}{f_i}$$

There are two major benefits from high processing gain:

1. Interference rejection: the ability of the system to reject interference is directly proportional to $G_p$.

2. System capacity: the capacity of the system is directly proportional to $G_p$—the higher the PN code bit rate (the wider the CDMA bandwidth), the better the system performance.

To spread the data the system performs multiplication between the PN components of the spreading sequence 2200 and the data signal information bits 2100 yielding spread spectrum signal 2300 as shown in FIG. 2.

Generating and Modulating a Filter from a Filter Bank

A system and method is disclosed for encoding a binary spread spectrum data stream, transmitting the stream in the base band or the encoded signal is transmitted by using the encoded stream to modulate a plurality of single carriers, which is de-modulated and decoded at the receiver.

Figure 5:
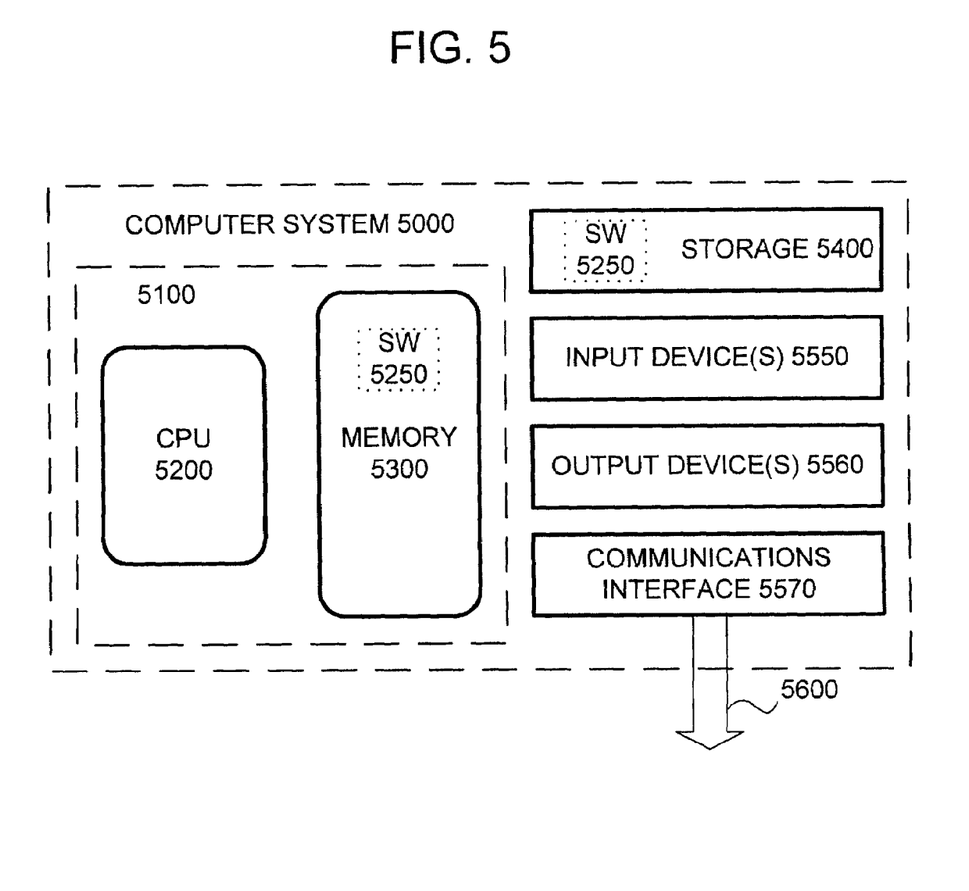
FIG. 5 is an exemplary processing system used to implement algorithms of the invention.

FIG. 5 illustrates a generalized example of a suitable computing environment 5000 in which an exemplary embodiment of the invention may be implemented. The computing environment shown in FIG. 5 is not intended to suggest any limitation as to scope of use or functionality of the invention, as the present invention may be implemented in diverse general-purpose or special-purpose computing environments.

With reference to FIG. 5, the computing environment 5000 of the apparatus and method of the invention includes at least one processing unit 5200 and memory 5300. It will be understood that the computing environment may be implemented within a communications system to control a transmitter and receiver, and is implemented in any one of several forms: (a) discrete hardware and software systems; (b) ASICs (application specific integrated circuits, and (c) FPGA (field-programmable gate array.

In FIG. 5, this most basic configuration 5000 is included within 5100 a dashed line. The processing unit 5200 executes computer-executable instructions and may be a real or a virtual processor. In a multi-processing system, multiple processing units execute computer-executable instructions to increase processing power. The memory 5300 may be volatile memory (e.g., registers, cache, RAM), non-volatile memory (e.g., ROM, EEPROM, flash memory, etc.), or some combination of the two. The memory 5300 stores executable software—instructions and data 5250—written and operative to execute and implement the software applications required to support the interactive environment of the invention.

The computing environment may have additional features. For example, the computing environment 5000 includes storage 5400, one or more input devices 5550, one or more output devices 5560, and one or more communication connections or interfaces 5570. An interconnection mechanism (not shown) such as a bus, controller, or network interconnects the components of the computing environment. Typically, operating system software (not shown) provides an operating environment for other software executing in the computing environment, and coordinates activities of the components of the computing environment.

The storage 5400 may be removable or non-removable, and includes magnetic disks, magnetic tapes or cassettes, CD-ROMs, DVDs, or any other medium which can be used to store information and which can be accessed within the computing environment. The storage 5400 also stores instructions for the software 5250, and is configured to store data collected and generated during at least one interactive session.

The input device(s) 5550 may be a touch input device such as a keyboard, mouse, pen, or trackball, a voice input device, a scanning device, or another device that provides input to the computing environment. For audio or video, the input device(s) may be a sound card, video card, TV tuner card, or similar device that accepts audio or video input in analog or digital form. The output device(s) 5560 may be a display, printer, speaker, or another device that provides output from the computing environment.

The communication interface 5570 enable the apparatus and software means to control communication over a communication medium 5600 with another similar system, for example, the system implements a transmitter that exchange messages with a similarly configured receiver. The communication medium conveys information such as voice signals, video, and data in a modulated data signal. A modulated data signal is a signal that has one or more of its characteristics set or changed in such a manner as to encode information in the signal. By way of example, and not limitation, the communication media include wired or wireless techniques implemented with an electrical, optical, RF, infrared, acoustic, or other carrier.

A Method of Encoding and Decoding a Signal by Filters for Modulation and Demodulation An exemplary signal encoding process using the invention is described with respect to FIG. 3 and also with reference to MatLab programming statements shown in Table 1-5, below.

With reference Table 1, the spread spectrum binary data stream is converted to Gray code by calling the function "bi2Grey" with the binary data assembled as a binary vector and passed as an argument. A Gray code is a special coding system designed to reduce undetected errors resulting from random perturbations of transmitted binary data. The function "bi2Grey" returns a binary vector with the data passed as an argument returned as a Gray coded binary vector. While a Gray coding has been used in the exemplary embodiment, the exemplary embodiment does not require Gray coding; other coding schemes to reduce transmission errors can be used.

With reference to Table 2, the function "wfactors" is called to return factors used in the processes of encoding and decoding a signal using wavelet filter banks. "wfactors" returns (a) "delay", the beginning index used to down-sample an input signal that is encoded using wavelet filters and (b) the system delay in samples; wherein the input signal is encoded and decoded according to the name of the wavelet, "wname", passed as an argument to "wfactors."

Table 2 shows delay factors used in an exemplary embodiment of the invention for the wavelet filters: (a) discrete Meyer; (b) Symlet 16; (c) Symlet 2; (d) Symlet 3; (e) Symlet 4; (f) Symlet 5; (g) Coiflet 2; and (h) Coiflet 3.

Figure 3:
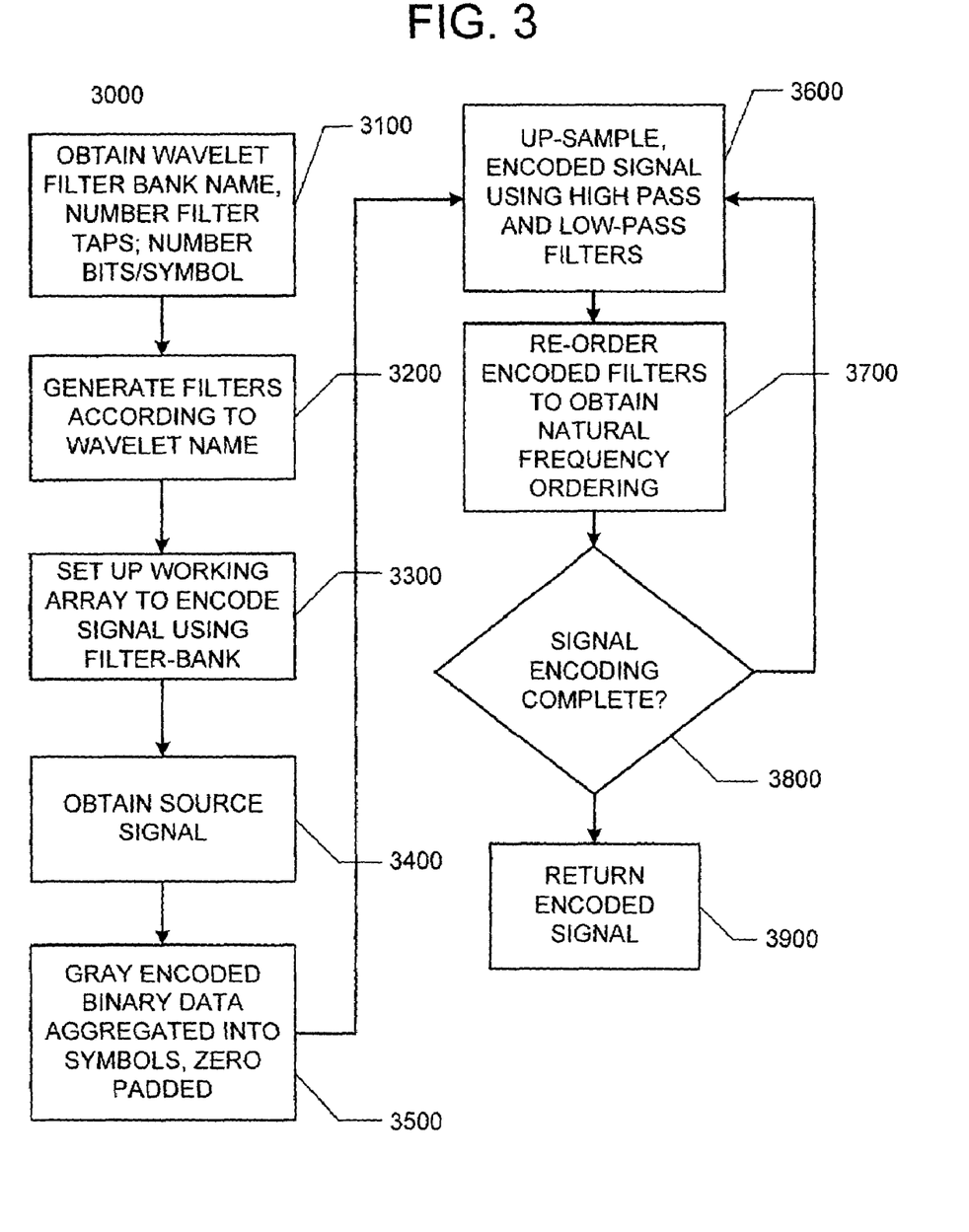
FIG. 3 is a logic diagram of applying a filter generated by a filter-bank to the spread spectrum data signal before transmission.

See FIG. 3, 3000, a flow diagram of the transmitter encoding process, and Table 3, which contains exemplary MatLab programming statements implementing the process used by the transmitter. The MatLab function "WPconstruct" is called to construct a signal using wavelet filters; "WPconstruct" is passed arguments related to the number of samples, or filter taps, related to filters used ("Nmaster"), and the name of the wavelet filter ("wname") to use in encoding a binary signal. In FIG. 3, 3100, the name of the wavelet filter bank used for signal encoding and the number of filter taps are obtained. In Table 3, In lines 13 and 14, the MatLab function "wfilters" is called to return the low-pass and the high-pass filter corresponding to "wname." In FIG. 3, 3200, the low-pass and high-pass filters corresponding to "wname" are generated.

In FIG. 3, 3300 and Table 3 lines 16-20 a working array is set up to encode a signal. With reference to FIG. 3, 3400, the source signal is obtained. In lines Table 3, lines 23-28, a random source is created for the purpose of test and illustration; in Table 3, the source signal is Gray encoded by calling the MatLab function "bi2Grey" shown in Table 1.

In FIG. 3, 3500, corresponding to Table 3, lines 27-30, the Gray encoded binary data is aggregated into symbols, and the symbols are zero padded.

With reference to FIG. 3, 3600-3700 and Table 3, lines 38-57, symbols are first (a) up sampled; (b) encoded using the low-pass and the high-pass filters given by "wname"; and (c) every other filter is switched to maintain natural frequency ordering in the filter-encoded symbols.

With reference to FIG. 3, 3800, the encoded symbols are recursively encoded according to the principles of filter-bank encoding, for example given N symbols, $\log_2 N$ encoding steps are executed. With reference to FIG. 3, 3900, the encoded symbols are returned by "WPconstruct."

The encoded symbols are then transmitted in the base band of a transmission system or the encoded symbols are employed to modulate a plurality of carriers, using available modulation techniques.

TABLE 1

```
   function g = bi2Grey(b)
   % BI2GREY converts a binary code to a Grey code. The most
1  % significant bit is the left hand side bit.
2  % When the input argument is a binary matrix, each row is
3  % converted to the Grey code.
4  %
5  % See also: GREY2BI
6  %
7  % Comments and suggestions to: adrian@ubicom.tudelft.nl
8
9     % copy the msb:
10
11    [r,c] = size(b);
12    g = zeros(r,c+1);
13    %Add a leading zero
14    g(:,1) = 0;%b(:,1)
15    b = [zeros(r,1), b];
16
17    for i = 1:c,
18        g(:,i+1) = xor(b(:,i+1), b(:,i));
19    end
20
21    g = g(:,2:end);
22    return;
```

TABLE 2

```
1   function [delay, DELTA] = wfactors(wavename)
2   % returns the appropriates factors for reconstructing/decomposing
3   % signals from wavelets at up to the sixth scale through filter banks
4
5   % Mark M. Westerman
6   % WavTech, Inc.
7   % Richardson, TX
8   % 9-13-2002
9
10
11  switch lower(wavename)
12  case 'dmey'
13      DELTA = 61;
14      delay = [1 1 0 0 0 0]; %dmey
15  case 'sym16'
16      DELTA = 31;
17      delay = [1 0 0 0 0 1]; %sym16
18  case 'sym2'
19      DELTA = 3;
20      delay = [1 0 1 1 1 1]; %sym2
21  case 'sym3'
22      DELTA = 9;
23      delay = [1 1 0 1 1 1]; %sym3
24  case 'sym4'
25      DELTA = 3;
26      delay = [1 0 0 1 1 1]; %sym4
27  case 'sym5'
28      DELTA = 9;
29      delay = [1 1 1 0 1 1]; %sym5
30  case 'coif2'
31      DELTA = 11;
32      delay = [1 0 1 0 1 1]; %coif2
33  case 'coif3'
34      DELTA = 17;
35      delay = [1 1 1 1 0 1]; %coif3
36  case 'namez'
37      DELTA = [ ];
38      delay = [{'dmey'};{'sym 16'};{'sym2'};
            {'sym3'};{'sym4'};{'sym5'};{'coif2'}; {'coif3'}];
39  otherwise
40      DELTA = 1;
41      delay = [0 0 0 0 0 0];
42      disp('');
43      disp('------------CAUTION--------------------')
```

TABLE 2-continued

```
44      disp('-----------------------------------------------------')
45      disp('wfactors: unknown case, returning general case');
47      disp('delay = [0 0 0 0 0 0]');
48      disp('DELTA = 1');
49      disp('-----------------------------------------------------');
50      disp('-----------------------------------------------------');
51      disp('');
52
53  end;
```

TABLE 3

```
1   function [sig, syms] = WPconstruct(Nmaster, wname);
2   % WPConstruct - constructs a pseudo random signal through wavelet
    packet construction
3   % (accomplished through lifting)
4
5   %-----------------------------------------------------------
6   %          Wavelet packet lifting - Construction
7   %-----------------------------------------------------------
8   %-----------------------------------------------------------
9
10  % Nmaster = 64;
11  % wname =   'coif2';
12
13  [lo_r, lo_d] = wfilters(wname,'l');      % coefficients for
                                              low-pass filter
14  [hi_r, hi_d] = wfilters(wname,'h');      % coefficients for
                                              high-pass filter
15
16  N = Nmaster;
17  L = 1000;
18  K = 0.75*N-1;
19
20  symz = zeros(L+16,N);                    % create an array of zeros
21
22  %Add greycode functionality
23  symz(1:L,2:K+1) = randsrc(L,K,[1:16]);   % creates a matrix
                                              representing a random
                                              source
24  %
25  %
26  %
27  map = [0; bi2de((bi2Grey(de2bi((0:15)',
        'left-msb'))),'left-msb')*2-15];
28  syms = map(symz+1);
26
27  %4 bits per *channel* per symbol
28  % syms(1:L,IND) = randsrc(L,K,[1]);
29
30  % Pad with some zeros to flush the filters
31  L = L+16;
32
33  sig = syms;
34  % plot(sig)
35  % pause(3)
36
37  %Now construct the signal
38  for j = 1:log2(N)
39      N = N/2;
40      L = L*2;
41      old_sig = sig;
42      sig = zeros(L,N);
43
44      ind = 1;
45      for k=0:2:2*N-1
46
47          %To maintain natural frequency ordering,
              we must switch every other pair
48          %of HP/LP filters
49          k1 = mod(ind+1,2)+1;
50          k2 = mod(ind,2)+1;
51
52          sig(:,ind) = filter(lo_r,1,upsample(old_sig(:,k+k1)))'+ ...
53              filter(hi_r,1,upsample(old_sig(:,k+k2)))';
54
```

TABLE 3-continued

```
55      ind = ind+1;
56    end;
57  end;
58
60  syms = symz;
```

Figure 4:
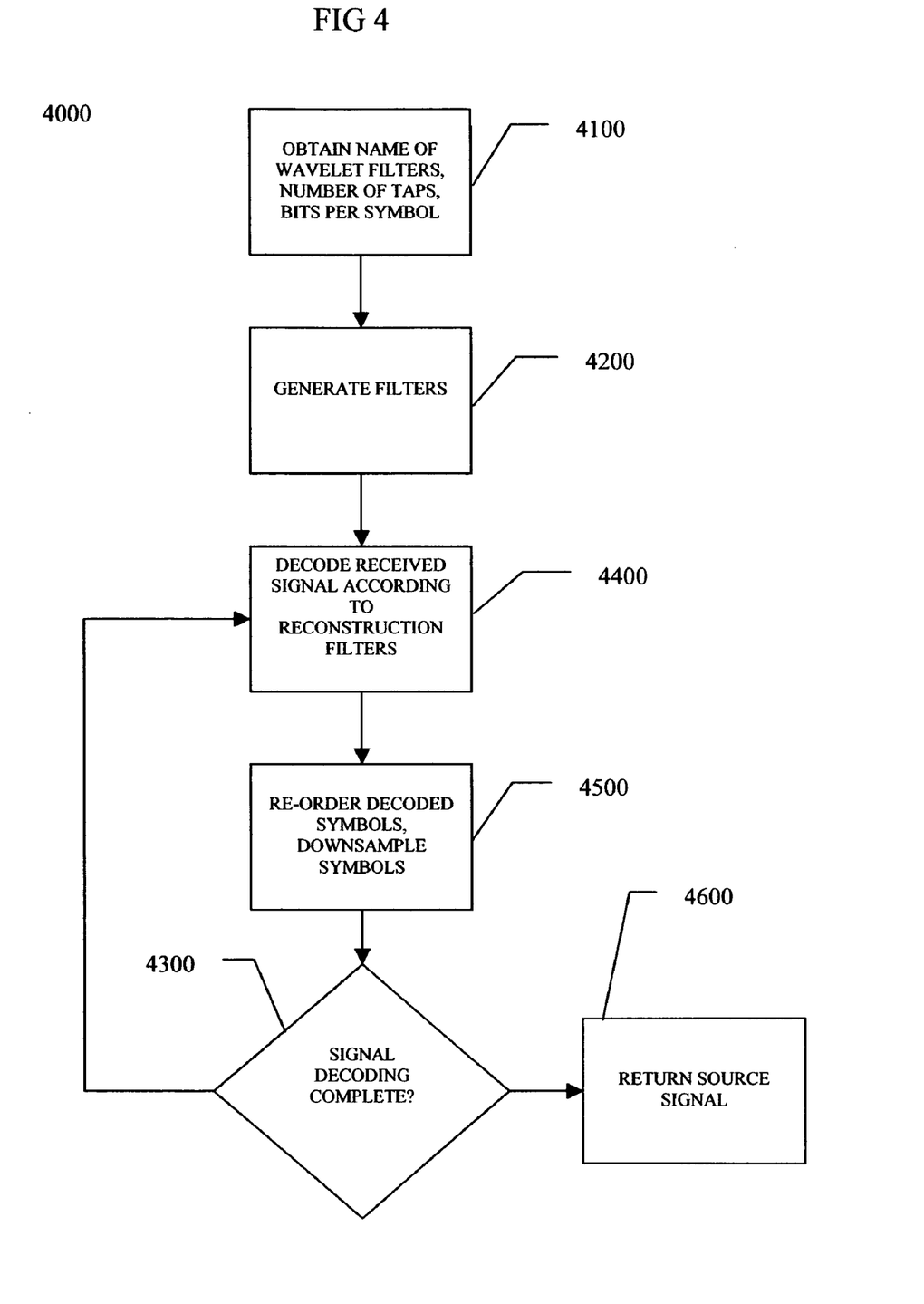
FIG. 4 is a logic diagram of applying a filter generated by a filter-bank to the spread spectrum data signal by the receiver.

With reference to FIG. 4, the receiver employs a corresponding exemplary process to decode received symbols. The exemplary process is further shown by a coding example using MatLab in Table 4 that follows. Table 4 illustrates coding used to decompose the symbols of the received signal and to convert the symbols back into the original binary stream processed by the transmitter.

TABLE 4

```
1   function [dec, DELTA] = WPdecompose(sig, Nmaster, wname);
2   %WPdecompose - decomposes a specially made sequence from
3                  WPconstruct
4   %-------------------------------------------------------
5   %            Wavelet packet lifting - Deconstruction
6   %-------------------------------------------------------
7   %-------------------------------------------------------
8
9   %delay determines the beginning index of downsampling
10  %DELTA is the delay (in samples) of the system
11  [delay, DELTA] = wfactors(wname);    % obtain delay for
                                          wavelet used
12
13  N = Nmaster;
14  [lo_r, lo_d] = wfilters(wname,'l');
15  [hi_r, hi_d] = wfilters(wname,'h');
16
17  Nprime = 1;
18  L = length(sig);
19
20  dec = sig;
21  swap = 1;
22
23  while Nprime <N
24      Nprime = 2*Nprime;
25      L = L/2;
26      old_dec = dec;
27      dec = zeros(L,Nprime);
28      ind = 1;
29
30      for k = 1:2:(Nprime)
31
32          tl = filter(lo_d,1,old_dec(:,ind));
33          th = filter(hi_d,1,old_dec(:,ind));
34
35          %Once again, we must swap the LP/HP sections
36          k1 = mod(ind+1,2);
37          k2 = mod(ind,2);
38
39          dec(:,k + k1) = tl(1+delay(swap):2:end);
40          dec(:,k + k2) = th(1+delay(swap):2:end);
41          ind = ind+1;
42      end;
43      swap = swap+1;
44      % keyboard
45  end;
```

With reference to FIG. 4, a flow diagram 4000 of the receiver decoding process is shown. With reference to the MatLab programming statements in Table 4, the receiver decoding logic "WPdecompose" is called when the receiver acquires a signal. With reference to Table 4, line 1, "WPdecompose" is called by passing arguments: (1) the signal acquired; (2) the number of filter taps used for encoding filters; and (3) type of wavelet filter used to encode the signal.

With reference to FIG. 4, 4100-4200 and Table 3, lines 14-15, decoding or reconstruction filters are derived or obtained—the decoding filters generated according to the requirements of quadrature mirror filter perfect reconstruction.

With reference to FIG. 4, 4400-4500 and Table 3, lines 30-45, the encoded symbols are decoded using the reconstruction filters. At each iteration of the reconstruction, filter coefficients that were swapped in order to achieve natural frequency ordering are swapped again so that the coefficients will be in proper order for reconstruction of the signal encoded by the transmitter. Zeroes inserted by the transmitter up-sampling are removed by down-sampling the signal during each iteration of the decoding.

With reference to FIG. 4, 4300, the reconstruction is recursively executed until the original encoded symbols are decoded. The reconstructed or decoded signal is returned from the receiver 4600.

A MatLab Script Demonstrating the Combined use of the MatLab Programming Examples With reference to Table 5 a MatLab script is shown that uses the MatLab functions shown in previous tables. The script calls the MatLab functions used by the transmitter and the receiver to encode, and decode a signal. The script simulates modulation and signal corruption.

TABLE 5

```
%A script for evaluating the performance of the OFDM/DMT
wavelet varient
Nmaster = 16;
wname = 'coif2';
[sig,syms] = WPconstruct(Nmaster,wname);
n = 0.75*Nmaster – 1;
SNR = 25;
noise_lev = 10^(-SNR/10)*var(sig);
sym_errs = 0
bit_errs = 0;
num_bits = 0;
while bit_errs<20
    noise = noise_lev*randn(size(sig));
    [dec, DELTA] = WPdecompose(sig + noise, Nmaster, wname);
    map = [0 1 3 2 7 6 4 5 15 14 12 13 8 9 11 10]' + 1;
    [INDX,QUANT] = quantiz(dec(DELTA:
    DELTA+999,[2:n+1]),[-14:2:14], map);
    Q = map(reshape(INDX, 1000,n)+1);
    errs = symerr(Q,syms(1:1000,2:n+1));
    sym_errs = sym_errs + errs;
    if errs %Only compute BER if there are symbol errors
        biterrs = biterr(Q, syms(1:1000,2:n+1));
    else
        biterrs = 0;
    end;
    num_bits = num_bits + 4000*n;
    bit_errs = bit_errs + biterrs;
    fprintf('(%f, %f, %f)\n',errs, biterrs, bit_errs/num_bits);
end;
```

An exemplary implementation has been disclosed. Other implementations are possible, with variations including: (1) employment of wavelet filters other than those described; (2) employment of special wavelet filters derived from the process of wavelet lifting, whereby filters that are most suited to the signal are derived, wherein suitability is measured by the number of vanishing moments of the wavelet filters used; (3) utilization of signal compression obtained from efficiencies of wavelet filter encoding; (4) special modulation schemes using the encoded symbols to modulate a carrier, and (5) other known methods for frequency-spreading a data signal.

What is claimed is:

1. A method of transmitting a spread spectrum signal from a transmitter comprising:

(a) parsing a spread spectrum serial bit stream into a plurality of parallel streams;

(b) within each of said plurality of parallel streams, forming a plurality of successive symbols;

(c) generating a signal from said plurality of successive symbols, wherein said signal is generated by the steps of:

(c1) up sampling by inserting zeros between said plurality of successive symbols;

(c2) selecting a low-pass filter and a high-pass filter pair derived from a wavelet packet transform for encoding said plurality of successive symbols; and (c3) alternating an ordering of said low-pass and high-pass filters within each pair to preserve a natural frequency ordering of said filter encoded plurality of successive symbols;

(d) repeating steps (c1) through (c3) recursively $\log_2 N$ times for a signal of length N yielding the spread spectrum signal; and (e) transmitting the spread spectrum signal from the transmitter.

2. The method according to claim 1 further comprising the step of:

utilizing a spread spectrum technique to create said spread spectrum serial bit stream.

3. The method according to claim 1 further comprising the step of:

utilizing a chipping frequency $f_c$ and a data frequency $f_i$ to create said spread spectrum serial bit stream wherein a ratio of $f_c$ to $f_i$ is greater than or equal to 1.

4. The method according to claim 1 wherein in step (b) a number of bits per symbol does not need to remain constant.

5. The method according to claim 1 wherein each of said plurality of symbols are formed from the set $\{0, 1, \ldots 2^k-1\}$ where k is the number of bits per symbol.

6. The method according to claim 1 wherein step (b) further comprises the step of:

pre-coding said plurality of symbols to decrease a probability of bit errors.

7. The method according to claim 6 wherein said pre-coding utilizes a Gray code.

8. The method according to claim 1 wherein step (e) further comprises transmitting the spread spectrum signal in a base band of the transmitter.

9. The method according to claim 1 wherein step (e) further comprises transmitting the spread spectrum signal by modulating a carrier of the transmitter.

10. The method according to claim 1 further comprising the step of:

receiving the spread spectrum signal in a receiver; and performing in said receiver steps (a), (b), and (c) in reverse order to recover said plurality of symbols.

11. A method for encoding a source signal in a transmitter comprising:

(a) obtaining a wavelet filter bank name and a number of filter taps for encoding the source signal;

(b) generating a plurality of low-pass and high-pass filters corresponding to said wavelet filter bank name;

(c) setting up a working array to encode the source signal;

(d) obtaining the source signal;

(e) forming a binary data of the source signal into a plurality of symbols;

(f) up sampling said plurality of symbols by inserting zeros between successive symbols;

(g) encoding said up sampled plurality of symbols with said plurality of low-pass and high-pass filters, wherein an ordering of said low-pass and high-pass filters within each pair is switched to preserve a natural frequency ordering in said encoded plurality of symbols;

(h) repeating steps (f) and (g) recursively $\log_2 N$ times for N number of symbols producing an encoded signal; and (i) transmitting said encoded signal.

12. The method according to claim 11 further comprising the step of:

applying a spread spectrum technique to a serial bit stream of the source signal, wherein said serial bit stream is parsed into several parallel bit streams.

13. The method according to claim 11 wherein step (e) further comprises;

pre-coding a binary data of the source signal to decrease a probability of bit errors.

14. The method according to claim 13 wherein said pre-coding utilizes a Gray code.

15. The method according to claim 11 wherein in step (e) a number of bits per symbol does not need to remain constant.

16. The method according to claim 11 wherein each of said plurality of symbols are formed from the set $\{0, 1, \ldots 2^k-1\}$ where k is the number of bits per symbol.

17. The method according to claim 11 wherein step (i) further comprises transmitting said encoded signal in a base band of the transmitter.

18. The method according to claim 11 wherein step (i) further comprises transmitting said encoded signal by modulating a carrier of the transmitter.

19. The method according to claim 11 further comprising the step of:

receiving said encoded signal in a receiver;

obtaining said wavelet filter bank name and said number of filter taps used for said encoded signal;

generating a plurality of reconstruction filters corresponding to said wavelet filter bank name;

decoding a plurality of symbols in said encoded signal with said plurality of reconstruction filters;

reordering said decoded plurality of symbols; and down-sampling said reordered and decoded plurality of symbols to recover the source

* * * * *

UNITED STATES PATENT AND TRADEMARK OFFICE
CERTIFICATE OF CORRECTION

PATENT NO.         : 7,394,844 B1                                    Page 1 of 1
APPLICATION NO.    : 10/849535
DATED              : July 1, 2008
INVENTOR(S)        : David E. Orr

It is certified that error appears in the above-identified patent and that said Letters Patent is hereby corrected as shown below:

Title page, in the first column, after item (22) Filed: May 19, 2004 and before item (51) Int. Cl.,
Add -- Related U.S. Application Data --
Add -- (60)    Provisional application No. 60/471,961, filed on May 19, 2003. --.

Column 12,
line 57, Add the word -- signal. -- after the word "source".

Signed and Sealed this

Ninth Day of September, 2008

JON W. DUDAS
*Director of the United States Patent and Trademark Office*